May 16, 1967

J. D. ALBRIGHT ET AL 3,320,615

PASSIVE ANGLE RANGING APPARATUS

Filed Nov. 30, 1964

INVENTORS
JOHN D. ALBRIGHT
CLYDE R. CHADBOURNE

BY Claude Funkhouser
ATTORNEY
Lawrence G. Hoffman
AGENT

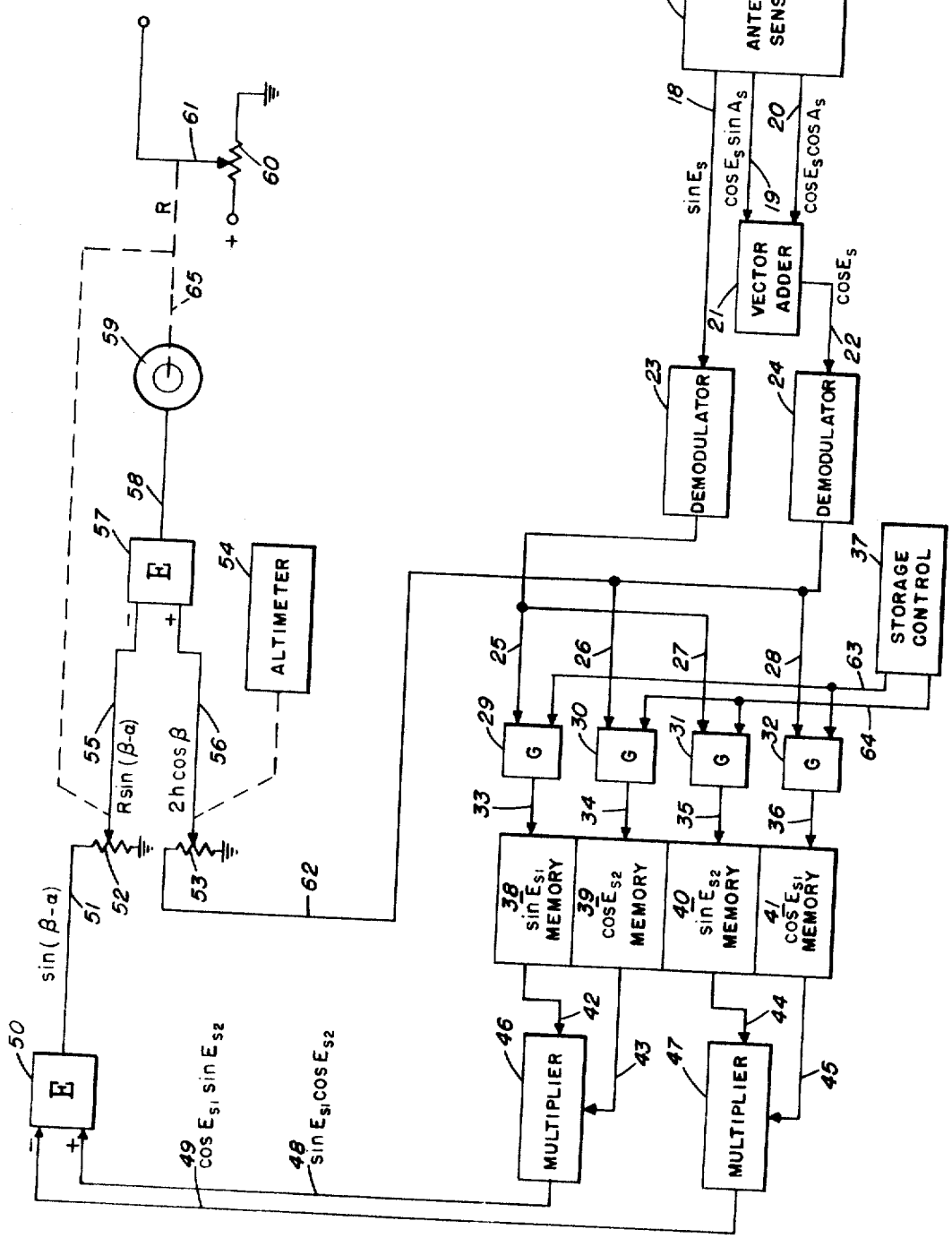

3,320,615
PASSIVE ANGLE RANGING APPARATUS
John D. Albright, Beltsville, and Clyde R. Chadbourne, Baltimore, Md., assignors, by mesne assignments, to the United States of America as represented by the Secretary of the Navy
Filed Nov. 30, 1964, Ser. No. 414,934
4 Claims. (Cl. 343—112)

The present invention relates to an improved angle ranging method and system and more particularly to an improved angle ranging method and system wherein accuracy comparable to that of present equipment is achieved by a far simpler system than any presently available.

One of the most common uses of radar systems is in the measurement of the range to a target. Nearly all forms of radar including standard pulse and pulse doppler types require that the target be illuminated by transmitting from the radar system a considerable amount of electromagnetic energy. The radiation of this energy reveals to the target the existence, direction, and many of the characteristics of the illuminating system. There are many tactical situations in air combat when it is very desirable to know the range to a target aircraft without revealing one's own position.

If the target aircraft is equipped with a radar system of its own, it is possible to measure range by using only the radiation produced by the target aircraft's radar. One such passive system computes range to the target aircraft on the basis of own aircraft altitude, vertical angle to the target measured with respect to the horizontal and the differential time delay between signals received directly from the target and signals from the target reflected off the earth. A system of this type has been built and flight tested and is the best presently used passive ranging technique for air-to-air encounters. While there are several possible mechanizations of such a system, all require that the radar making the range computation know the three variables noted above (own aircraft altitude, target vertical angle, and differential path length). Altitude data may be supplied by any suitable altimeter, while target angle may be measured by looking directly at the radiating target. Differential path length is determined by suitably delaying signals from the direct path and autocorrelating them with signals reflected off the earth. The autocorrelation process determines path differential time delay which multiplied by the velocity of light, gives the distance by which the reflected path length exceeds the direct path length.

Such systems, while quite useful, do possess a number of drawbacks. In particular, under certain circumstances, such as air-to-air encounters at low altitude, it is very desirable to measure range with reasonable accuracy. This presents difficulties for a ranging system which measures differential path lengths by autocorrelating signals in time. For example, when the path difference for a time delay between paths is small (about 0.2 microsecond or less) accurate autocorrelation or some function equivalent to it requires very elaborate mechanization. In one of the practical systems of this type, for example, a minimum of 0.2 microsecond time resolution is possible. This produces very large computed range errors at altitude near 1,000 feet and at true ranges much in excess of 2 nautical miles. Even under the conditions of normal high altitude flight, use of a system involving autocorrelation to determine differential path length results in a complicated, large, and expensive system.

It is an object of the present invention to provide an air-to-air ranging system having at least the accuracy of present systems, which can be mechanized in such a way as to avoid the difficult, bulky and expensive autocorrelation technique.

It is a further object of the present invention to provide a passive air-to-air ranging system which does not depend for its operation upon measurement of differential path length.

It is a further object of this invention to provide a passive air-to-air ranging system having improved accuracy in low level air-to-air encounters.

The present invention accomplishes the above mentioned objects by the employment of a novel technique involving only the measurement of the aircraft's own altitude, the vertical angle to the radiating source measured with respect to the horizontal, and the vertical angle to the target image in the ground plane measured with respect to the horizontal.

The exact nature of this invention as well as other objects and advantages thereof will be readily apparent from consideration of the following specification relating to the annexed drawings in which:

FIG. 2 shows a block diagram of a preferred mechanization of a system which employs the method of this invention.

Figure 1:
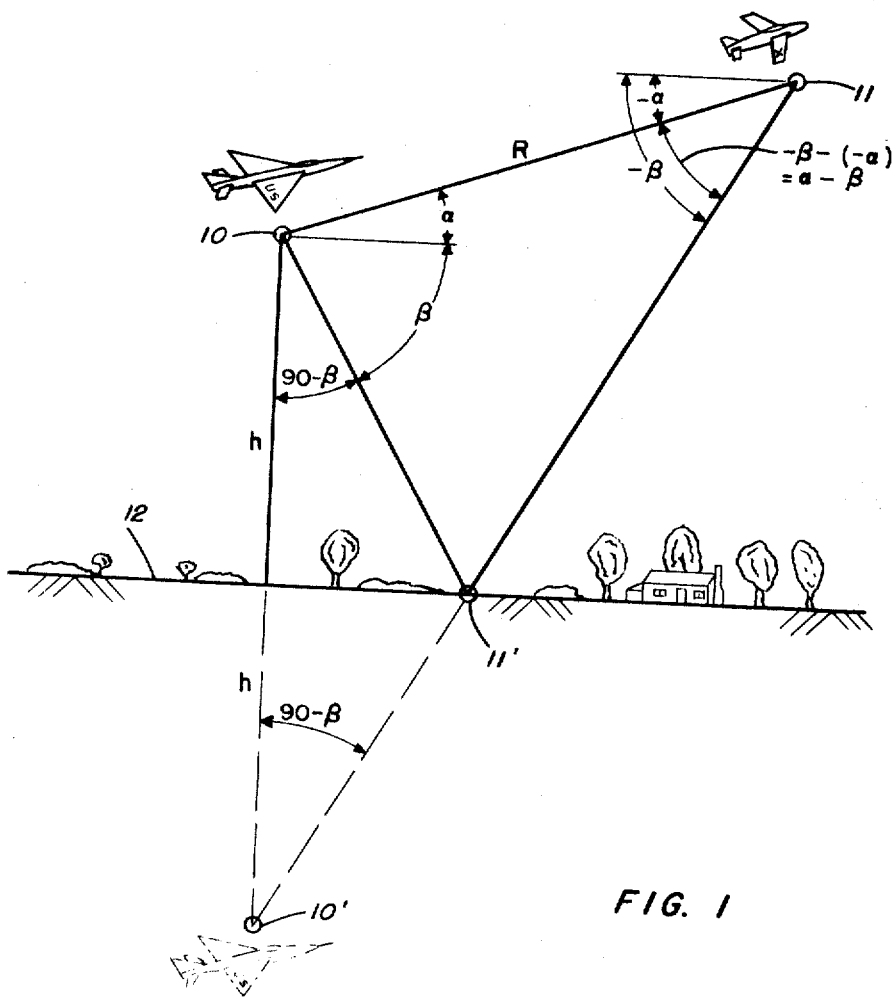
FIG. 1 shows the geometry of the novel range measuring technique.

Referring now to FIG. 1, an aircraft equipped with a passive ranging system of the present invention is denoted as 10, and the target aircraft as 11. The ranging aircraft 10 is shown at an altitude $h$ over the earth 12, which is assumed to be flat. Target aircraft 11 is shown at a true range $R$ and the vertical angle $\alpha$. The vertical angle to the image reflection point 11' in the ground plane 12 is $\beta$. The ranging aircraft image in the ground plane is shown at point 10'. The included angles at points 10' and 11 are as shown in the figure.

To determine the value of R, one may use a form of the law of sines:

$$\frac{2h}{\sin(\alpha-\beta)} = \frac{R}{\sin(90-\beta)} \quad (1)$$

Recognizing that $$\sin(90-\beta) = \cos\beta$$

it is clear that:

$$R = \frac{2h \cos\beta}{\sin(\alpha-\beta)} = \frac{2h \cos\beta}{-\sin(\beta-\alpha)} \quad (2)$$

Angles measured downward from the horizontal are given a negative sign. The above equation holds regardless of whether the target 11 is above (as shown in FIG. 1), co-altitude with, or below the ranging aircraft 10. Equation 2 is a very simple relationship and readily computed.

The system would operate by first looking directly at the radiating target 11, and measuring the elevation angle $\alpha$. This angle is fed into a computer and briefly stored while the antenna swings directly down to locate the target image reflected off the ground. This angle $\beta$ is also fed to the computer. The two angles plus the altitude $h$ allow a value for R to be computed.

In the use of this scheme, it is assumed that the ground plane 12 represents a flat earth. This assumption is valid since for ranges of 100 nautical miles or less, the differences between flat earth and curved earth geometries are insignificant. Furthermore, the geometry of the curved earth case is more complex in mechanization, and any improvement in range accuracy is doubtful. It should be noted that the target image in the ground plane is never an exactly fixed or stable point. There will, therefore, be some scintillation error in the measurement of β. However, antenna mechanical inertia will tend to smooth out some of the jitter in the position of the reflected point 11'.

FIG. 2 shows a block diagram of one of several possible mechanizations of the range computation technique outlined in FIG. 1.

The ranging aircraft will be provided with a suitable antenna (not shown). The azimuth angle $\lambda_a$, and elevation angle $\lambda_e$, are provided by links 16 and 17 which may be either mechanical or electrical in nature. Additionally, the aircraft roll angle $\phi$ and climb angle $\theta$ are also provided in any suitable way by links 14 and 15. Information concerning these variables is provided by antenna sensor 13 to the remainder of the system. The pertinent variables provided by sensor 13 are trigonometric functions of the elevation and azimuth angles of the receiving antenna with respect to a space coordinate system having a horizontal axis. If $E_s$ and $A_s$ are the elevation angle and azimuth angle, respectively, in the space coordinate system, a typical antenna sensor arrangement might provide on leads 18, 19 and 20, respectively, 400 cycle A.C. signals proportional to $\sin E_s$, $\cos E_s \sin A_s$, and $\cos E_s \cos A_s$.

Since the range Equation 2 is seen not to depend upon the azimuth of the target with respect to the aircraft, it is necessary to eliminate the azimuth dependence of the signals supplied by antenna sensor 13. To this end, vector adder 21 is provided with the signals appearing on leads 19 and 20 to eliminate the azimuth component therefrom. Accordingly, on lead 22, a 400 cycle signal proportional to $\cos E_s$ is provided, while on lead 18, a 400 cycle signal proportional to $\sin E_s$ is present.

Use of the quantities $\sin E_s$ and $\cos E_s$ may readily be made in the present invention by slight modification of Equation 2. If $E_{s1}$ denotes the elevation space angle measured first at a time T1 and corresponding to $\alpha$ in Equation 2 and $E_{s2}$ is the elevation space angle measured next at T2, and corresponding to $\beta$ in Equation 2, then Equation 2 may be expanded using will known trigonometric identities in the form:

$$R = \frac{2h \cos E_{s2}}{\sin E_{s1} \cos E_{s2} - \cos E_{s1} \sin E_{s2}} \quad (3)$$

Thus, it may be seen that signals proportional to $\sin E_s$ and $\cos E_s$ may readily be used to present range Equation 2 in the form of Equation 3.

The 400 cycle signals appearing on leads 18 and 22 are first fed through demodulators 23 and 24. A D.C. signal proportional to $\sin E_s$ appears on leads 25 and 27, while a D.C. signal proportional to $\cos E_s$ appears on leads 26 and 28. Leads 25 through 28 are connected to gate circuits 29 through 32, respectively, the outputs of which are provided over leads 33 through 36 to memory circuits 38 through 41, respectively, which may be suitable RC networks. Switching signals for gates 29 through 32 are provided over leads 63 and 64 from storage control 37. The outputs of memory circuits 38 and 39 are provided over leads 42 and 43, respectively, to a suitable multiplier 46. Similarly, the outputs of memory circuits 40 and 41 are provided over leads 44 and 45, respectively, to a similar multiplier 47. The outputs of multipliers 46 and 47 are provided over leads 48 and 49, respectively, to summing circuit 50. The output of summing circuit 50 is provided over lead 51 to one end of motor driven potentiometer 52. In the same manner, the output of demodulator circuit 24 is provided over lead 62 to the upper end of motor driven potentiometer 53. Arm 56 of potentiometer 53 is driven by the output of a suitable altimeter 54 which provides a signal porportional to the height above the flat earth. Both leads 55 and 56 are connected to summing circuit 57, the output of which is provided over lead 58 to a suitable motor 59. Motor 59 drives arm 55 of potentiometer 52 as well as arm 61 of output potentiometer 60.

In operation, when the antenna is looking directly at the target, a signal is provided by storage control 37 over lead 63. This storage control signal unblocks gates 29 and 32 whereby signals proportional to $\sin E_{s1}$ and $\cos E_{s1}$ may pass over leads 33 and 36, respectively. These signals are stored in memory units 38 and 41.

The antenna is then moved rapidly downward to locate the target image in the ground plane. During the downward motion gates 29 and 32 are opened and a signal appears on lead 64 closing gates 30 and 31. When the target image is found, signals representative of $\sin E_{s2}$ and $\cos E_{s2}$ pass over leads 34 and 35, respectively, to memory circuits 39 and 40. The required time of storage for the first set of data is therefore, only slightly longer than required for the antenna to sweep from the target itself to its image.

The outputs of memory circuits 38 and 39 are fed over leads 42 and 43 to multiplier 46.

The outputs of memory circuits 38 and 39 are fed over leads 42 and 43 to multiplier 46, providing a signal on lead 48 proportional to $\sin E_{s1} \cos E_{s2}$. Similarly, the outputs of memory circuits 40 and 41 are fed over leads 44 and 45 to multiplier 47, providing a signal on lead 49 proportional to $\cos E_{s1} \sin E_{s2}$. The signal appearing on lead 48 is subtracted from the signal appearing on lead 49 by summing circuit 50 to provide a signal on lead 51 proportional to $\sin (\beta - \alpha)$. The signal appearing on lead 27 proportional to $\cos E_s$ is provided over lead 62 to one end of potentiometer 53, the arm of which is driven by the altitude sensor 54. Accordingly, upon measurement of $E_{s2}$, the signal appearing at the output of arm 56 is proportional to $2h \cos \beta$. The gear motor 59, driven by summing amplifier 57 over lead 58, has an output shaft the position of which is proportional to the computed range R. This shaft position also controls the position of the arm of potentiometer 52 so that lead 55 provides an otuput equal to $R \sin (\beta - \alpha)$. The output of summing circuit 57, therefore, provides a signal which is equal to $R \sin (\beta - \alpha) - 2h \cos \beta$.

Motor 59 is driven until the signal appearing on lead 58 is zero, namely when $$R \sin (\beta - \alpha) - 2h \cos \beta = 0 \quad (4)$$

Since R is the only variable in Equation 4, it may be seen that the final position of the shaft 65 of motor 59 is indicative of the correct computed value for range. The shaft angular position may be converted to a suitable electrical signal by means of potentiometer 60, arm 61 of which is driven by shaft 65.

As previously indicated, one of the deficiencies of prior art devices which depend on autocorrelation techniques is a loss of accuracy for low altitude short range encounters. With the present system, for altitudes near a thousand feet, and ranges on the order of 10 nautical miles, downlook angles as small as 3 degrees may be obtained. Therefore, with angles of that size or larger, there will be no basic inaccuracy related to the mechanization in the final computed value of range.

It should be noted that when the radar antenna is aimed downward toward the ground to measure the angle $\beta$, it is possible that some direct energy from the target will get into the antenna side lobes in sufficient power to confuse the angle measurement. Whether this in fact will happen depends upon the exact structure and orientation of the antenna side lobes in the space vertical direction. However, radar systems having a guard antenna and receiver channel could eliminate the effects of such side lobe leakage.

Obviously, many other modifications and variations of the present invention are possible in light of the above teachings. It is, therefore, to be understood that within the scope of the appended claims, the invention may be practiced otherwise than as specifically described.

What is claimed is:

1. A system for determining the distance between an airborne receiver and an airborne radiating source, comprising radiation receiving means adapted to search for a source of radiation, means to provide signals proportional to the sine and cosine of a first angle formed by the intersection of a line between said receiving means and the radiation source and a line parallel to the surface of the earth, means to store signals representative of the sine and cosine of said first angle, means to store signals representative of the sine and cosine of a second angle formed by the intersection of a line between the point of reflection of the radiation radiated by said source and said receiving means and a line parallel to the surface of the earth, first computer means responsive to the stored signals to provide a signal representative of the sine of the difference between said first and said second angles, means to measure the altitude of the airborne receiver, and second computing means responsive to the cosine of said second angle, the altitude, and the sine of the difference between said first and said second angles, to provide an indication of the distance to the radiating source.

2. The system defined by claim 1 wherein
the first computing means includes first and second multipliers, the first of which provides a product of the sine of said first angle and the cosine of the second angle, and the second of which provides the product of the cosine of said first angle and the sine of said second angle, and means to subtract the output signal of the second multiplier from the output signal of the first multiplier.

3. The system of claim 2 wherein the second computing means includes a third multiplier to provide a signal proportional to the product of the altitude and the cosine of said second angle, fourth multiplier means to provide the product of a signal proportional to the desired distance and the sine of the difference between said first and said second angles, and comparison means to determine difference between the outputs of the third and fourth multipliers, and means connected to the comparison means to vary the factor proportional to the desired distance until the output of the comparison means is a minimum.

4. A system for determining the distance between an airborne receiver and an airborne radiating source comprising radiation receiving means in the receiver having at least one degree of freedom, storage means connected to the radiation receiver to record signals indicative of the angles at which radiations are received from the radiating source, said angles formed by the intersection of lines between said receiving means and radiating source and a line parallel to the surface of the earth, first generating means connected to the receiving means to provide a signal indicative of the cosine of the angles at which radiation is received, second generating means connected to the storage means to provide a signal indicative of the sine of the difference between two angles at which radiation is received, altimeter means to determine the altitude of the receiver, third generating means connected to the altimeter and first generating means to provide a signal proportional to the product of the altitude and the cosine of the receiving angle, means to multiply the output of the second generator by a factor proportional to the desired distance, means to compare the product of the altitude times the cosine of the received angle with the product of the desired distance and the sine of the difference between the angles, and means to vary the factor by which the output of the second generator is multiplied until the output of the comparison means is a minimum.

References Cited by the Examiner
UNITED STATES PATENTS

| 2,837,738 | 6/1958 | Van Valkenburgh | 343—112 |
| 3,229,283 | 1/1966 | Hefter et al. | |

RODNEY D. BENNETT, *Primary Examiner.*

CHESTER L. JUSTUS, *Examiner.*

D. C. KAUFMAN, *Assistant Examiner.*